United States Patent [19]

Blaskiewicz et al.

[11] 3,991,255

[45] Nov. 9, 1976

[54] ADHESION OF POLYURETHANE TO EPDM ELASTOMER

[75] Inventors: Arthur A. Blaskiewicz, Danbury; Julian M. Mitchell, New Haven, both of Conn.

[73] Assignee: Uniroyal Inc., New York, N.Y.

[22] Filed: Jan. 9, 1975

[21] Appl. No.: 539,761

[52] U.S. Cl. ............................... 428/425; 156/306; 156/333; 260/42.33; 260/42.37; 260/42.34; 427/302; 427/385 B; 427/322; 427/400; 428/423; 428/522; 428/521
[51] Int. Cl.² ........................................ B32B 27/40
[58] Field of Search ........... 156/306, 308, 228, 333, 156/334; 427/302, 444, 385, 322, 400; 428/423, 500, 425, 521, 543, 523, 522; 264/134, 259, 236, 347; 260/42.33, 42.34, 42.38, 42.35, 42.37, 80.78

[56] References Cited
UNITED STATES PATENTS

| | | | |
|---|---|---|---|
| 3,406,142 | 10/1968 | Hawley | 260/42.33 |
| 3,485,791 | 12/1969 | Callan | 260/42.33 |
| 3,524,826 | 8/1970 | Kresge et al. | 260/80.78 |
| 3,528,848 | 9/1970 | Zoebelein | 428/521 |
| 3,528,943 | 9/1970 | Goldberg et al. | 156/333 |
| 3,532,592 | 10/1970 | Kraus et al. | 156/333 |
| 3,657,046 | 4/1972 | Furukawa et al. | 156/333 |
| 3,694,304 | 9/1972 | Palumbo | 260/42.33 |
| 3,764,365 | 10/1973 | Duncan et al. | 428/425 |
| 3,813,257 | 5/1974 | West | 427/302 |
| 3,862,883 | 1/1975 | Cantor | 156/333 |

Primary Examiner—William A. Powell
Assistant Examiner—J. J. Gallagher
Attorney, Agent, or Firm—James J. Long

[57] ABSTRACT

The adhesion of a polyurethane, such as a polyurethane paint, to an EPDM surface, is greatly improved if the EPDM is first chemically modified by mixing it with a halogen donating material, such as an N,N-dihalosulfonamide or a cyclic N-haloamide (e.g., a halogenated hydantoin), and subjecting the mixture to elevated temperature.

13 Claims, No Drawings

ADHESION OF POLYURETHANE TO EPDM ELASTOMER

This invention relates to a method for adhering polyurethane to EPDM, and to a composite article comprising polyurethane adhered to EPDM.

Adhesion of polyurethane to EPDM presents an industrially important problem. Thus, in the manufacture of articles from EPDM elastomer, such as automobile filler panels, automotive window gaskets, door seals and curtain wall gaskets, it is frequently desirable to apply a polyurethane paint. In fact a wide variety of fabricated articles depend on the adhesion of automotive paint finishes to a rubber surface. One technique employed to develop adhesion of a paint finish to an EPDM rubber surface involves coating the surface with a polar material such as benzophenone and subjecting the surface to a high energy source, such as ultra violet light, which oxidizes the treated surface and promotes adhesion of the paint finish. According to another scheme, EPDM containing clay filler is subjected to surface treatment with ozone to promote adhesion of subsequently applied paint. The present invention provides a method of obtaining adhesion without necessity for treating with high energy radiation or ozone.

R. T. Morrissey, Rubber Chem. and Tech. 44, No. 4, in a series of papers on the halogenation of EPDM, disclosed that several useful properties can be imparted to blends using the halogenated EPDM and that good adhesion to metal is obtained with bromo-EPDM and a metal primer.

U.S. Pat. No. 3,804,798, Cantor, Apr. 16, 1974, discloses an EPDM adhesive composition containing a dioxime and an N-haloamide.

U.S. Pat. No. 3,862,883, Cantor, Jan. 28, 1975, (issued on application Ser. No. 319,273, filed Dec. 29, 1972), discloses adhering rubber to metal using an adhesive system comprising a halogen-donating material and a resorcinol-type material.

Copending application Ser. No. 436,416, filed Jan. 25, 1974, now U.S. Pat. No. 3,932,559, Cantor et al., Jan. 13, 1976 discloses an adhesive for nylon comprising EPDM that has been halogenated (e.g., by the action of an N-haloamide).

In accordance with the invention it has now been discovered that the adhesion of a polyurethane, such as a polyurethane paint, to an EPDM elastomer surface, is greatly improved if the EPDM is chemically modified by reaction with a halogen donating material. The modification of the EPDM with the halogen donating material may be carried out according to a two-step mixing procedure involving hot mixing the EPDM and halogenating material to bring about reaction, followed by mixing in at a lower temperature of accelerator and activator for cure of the EPDM. Alternatively, a one-step mixing procedure may be used in which the halogen donating material and curatives are mixed into the EPDM at a temperature insufficiently elevated to bring about reaction, in which case reaction occurs subsequently when the shaped EPDM article is subjected to heat in the curing step. The EPDM treated according to the one-step or two-step mixing procedure develops remarkable adhesion to a subsequently applied polyurethane paint or other polyurethane composition.

The EPDM rubber employed in the invention may be defined in the usual conventional manner as an amorphous, sulfur-vulcanizable, elastomeric, unsaturated copolymer of at least two different alpha-monoolefins of the formula $CH_2=CHR$, where R is hydrogen or alkyl having for example 1 to 8 carbon atoms, and at least one copolymerizable polyene, ordinarily a diene, usually a non-conjugated diene, whether open chain as in 1,4-hexadiene or cyclic (particularly a bridged ring cyclic diene) such as dicyclopentadiene or 5-ethylidene-2-norbornene. Usually the EPDM is a terpolymer of two alpha-monoolefins (one of which is ordinarily ethylene, the other most frequently being propylene) and a non-conjugated diene.

The halogen donors useful in the invention have been observed to fall into two classes. The first class comprises N,N-dihalogenated aromatic sulfonamides wherein sulfonamide nitrogen is bonded to two atoms of chlorine, bromine or iodine and the sulfonyl sulfur is bonded directly to the aromatic nucleus. Such sulfonamides have the general formula $Y[SO_2NX_2]_n$ where X is chlorine, bromine or iodine, Y is phenyl, naphthyl, biphenyl or

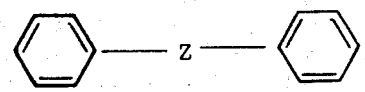

where Z is oxygen, sulfur, or alkylene or alkylidene having from 1 to 3 carbon atoms, and $n$ has a value of 2 or 3. Examples of suitable alkylene or alkylidene groups include methylene, ethylene, propylene, isopropylene, ethylidene, propylidene and isopropylidene. In the foregoing formula, the Y group can be unsubstituted or can be substituted with alkyl (especially lower, i.e. $C_1$ to $C_8$ alkyl) or aryl (especially phenyl) moieties.

Representative sulfonamide halogen donors used in the practice of this invention include those having the following structural formulae:

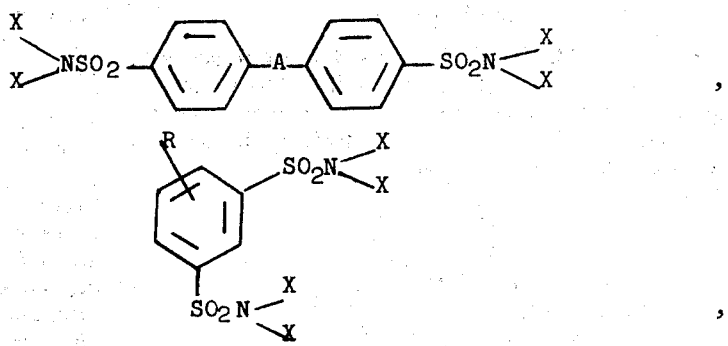

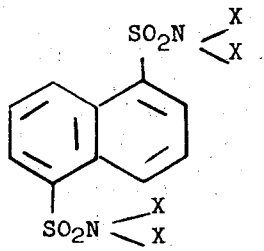

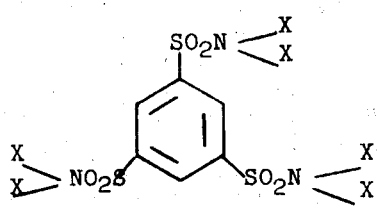

, and where X is either chlorine, bromine or iodine, A may be zero (i.e. the aryl groups may be linked by a single covalent bond as where the biaryl group is biphenyl), oxygen(oxy), sulfur(thio), $C_1$ to $C_3$ alkylene or alkylidene, and R represents hydrogen, alkyl (especially $C_1$ to $C_8$ lower alkyl) or aryl (especially phenyl) moieties. The sulfonamide halogen donors employed in the present invention may be prepared in known manner by reacting the corresponding unhalogenated aryl sulfonamides with an alkali metal hypohalite.

A second class of halogen donors employed in the invention comprises saturated, heterocyclic amides having a carbonyl carbon situated in the ring, with the carbonyl carbon being bonded to two N-halogenated nitrogen atoms both of which also reside in the heterocyclic ring, i.e. the heterocyclic ring system is characterized by the grouping:

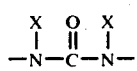

wherein X is a halogen such as chlorine, bromine or iodine. The cyclic amides may be further exemplified by hydantoins corresponding to the structural formula:

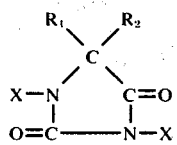

wherein X is chlorine, bromine or iodine and $R_1$ and $R_2$ are hydrogen or alkyl groups having from 1 to 4 carbon atoms, with the total of the carbons in both groups not exceeding 8. Other examples of suitable cyclic amides include: tetrachloroglycolurile

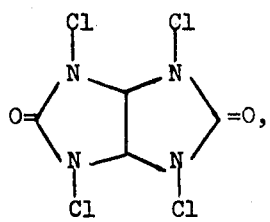

and trichloroisocyanuric acid

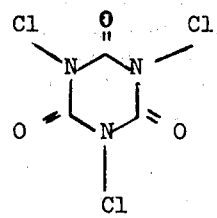

The polyurethane which is adhered to the halogen donor-modified EPDM in the practice of the invention may be defined in the conventional manner as a combination of at least one long chain polyol (whether a polyester polyol, a polyether polyol or a polyhydrocarbon polyol) and at least one organic polyisocyanate, whether a diisocyanate or a polyisocyanate of higher functionality, of aliphatic, cycloaliphatic, or aromatic type. The relative proportions of polyol and polyisocyanate may be as in conventional practice appropriate to the particular kind of final product desired and the processing or fabricating method chosen.

The polyether types of polyols employed in making polyurethanes include, as is well known to those skilled in the art, poly(oxyalkylene) glycols [e.g. poly (oxyethylene) glycol, poly(oxypropylene) glycol, poly(oxytetramethylene) glycol, etc.] and higher polyether polyols, such as triols [e.g. poly(oxypropylene triol)], including polyether polyols of higher functionality than three [e.g., poly(oxypropylene adducts of pentaerythritols) and poly(oxypropylene adducts of sorbitol)]. Mention may be made of such polyether polyols as poly(oxypropylene)-poly(oxyethylene) glycol, poly(oxypropylene) adducts of trimethylol propane, poly(oxypropylene)-poly(oxyethylene) adducts of trimethylolpropane, poly(oxypropylene) adducts of 1,2,6-hexanetriol, poly(oxypropylene)-poly(oxyethylene) adducts of ethylenediamine, poly(oxypropylene) adducts of ethanolamine, and poly(oxypropylene) adducts of glycerine.

The polyester types of polyols used in making polyurethanes are likewise well known in the art and require no detailed description here. It will be understood that they include chain extended polyesters made from a glycol (e.g., ethylene and/or propylene glycol) and a saturated dicarboxylic acid (e.g., adipic acid). By way of non-limiting example there may be mentioned poly(ethylene adipate) glycol, poly(propylene adipate) glycol, poly(butylene adipate) glycol, poly(caprolactone) glycol, poly(ethylene adipate-phthalate) glycol, poly(neopentyl sebacate) glycol, etc. Small amounts of trialcohols such as trimethylolproprane or trimethylolethane may be included in the polyester preparation. Polyester polyols with functionalities of three or more [e.g., glycerides of 12-hydroxystearic acid] are also useful. Suitable polyester polyols include those obtainable by reacting such polyols as 1,4-butanediol, hydroquinone bis(2-hydroxyethyl) ether, ethylene glycol, diethylene glycol, triethylene glycol, propylene glycol, dipropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, anhydroaneaheptitol, mannitol, sorbitol, methylglucoside, and the like, with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid, and chlorendic acid; the acid anhydrides and acid halides of these acids may also be used.

Among the polyhydrocarbyl polyols conventionally employed for making polyurethanes there may be mentioned by way of non-limiting example such materials as poly(butadiene) polyols, poly(butadiene-acrylonitrile) polyols and poly(butadiene-styrene) polyols.

The above polyols typically have a molecular weight of about 180 to 8000.

Conventional polyisocyanates used in polyurethane manufacture include, as is well known, aliphatic polyisocyanates, whether open chain, cycloaliphatic or araliphatic. Examples of aliphatic polyisocyanates conventionally employed are trimethylene diisocyanate, tetramethylene-1,4-diisocyanate, hexamethylene-1,6-diisocyanate, 1-methyl-2,4-and 1-methyl-2,6-diisocyanatocyclohexane and mixtures thereof, p-xylylene diisocyanate and m-xylylene diisocyanate (XDI) and mixtures thereof, 4,4'-diisocyanato-dicyclohexylmethane, isophorone diisocyanate, 2,2,4- and 2,4,4-trimethylhexamethylene diisocyanate, and the like.

Similarly, the aromatic polyisocyanates are suitable and include, by way of non-limiting example, such bodies as 2,4-toluene diisocyanate and 2,6-toluene diisocyanate and mixtures thereof (TDI, including crude and polymeric forms), 4,4'-diphenylmethane diisocyanate (MDI, including crude and polymeric forms), p-phenylene diisocyanate, 2,4,6-tolylene triisocyanate, 4,4',4''-triphenylmethane triisocyanate, 2,2-bis(p-isocyanato-phenyl)propane, polymeric methylene bis(phenyl-4-isocyanate) (e.g., PAPI), naphthalene-1,5-diisocyanate, 3,3'-dimethyl-4,4'-biphenylene diisocyanate, 3,3'-dimethoxy-4,4'-biphenylene diisocyanate, 3,3'-diphenyl-4,4''-biphenylene diisocyanate, 4,4'biphenylene diisocyanate, 3,3'-dichloro-4,4'-biphenylene diisocyanate, and the like. Mixtures of two or more of such diisocyanates may also be used. Triisocyanates typically obtained by the reaction of three moles of an arylene diisocyanate with one mole of triol — for example, the reaction product formed from three moles of tolylene diisocyanate and one mole of hexanetriol or of trimethylol propane, may be employed.

The polyurethane system employed may be of the so-called one-shot type, or of the prepolymer type. The polyurethanes employed include those curable at room temperature and those curable at elevated temperature. Moisture-curing types may be employed, as well as those curable by various other cross-linking or chain-extending agents such as polyfunctional (especially bifunctional) curing agents which react with reactive groups of the polyurethane (e.g., isocyanate groups, hydroxyl groups, amine groups). Blocked isocyanates may be used as curing agents, as well as diamines and other conventional chain extenders. Blocking agents are useful when it is desired to prevent premature cure. Catalysts may be used to accelerate the cure. One-part formulations or two-part formulations may be used. Volatile solvents may be included in the formulation. Depending on the particular system, the final polyurethane may have various properties (e.g., elastomeric, semi-rigid).

As indicated, the invention involves treatment of the EPDM by reacting it with the halogen donating material whereby adhesion of polyurethane to the EPDM is improved without any necessity for subjecting the surface of the EPDM to high energy radiation or to ozone. The adhesive bond is developed when the polyurethane is cured in surface-to-surface contact with the treated, cured EPDM. Such cure of the polyurethane may be effected at ambient temperature, or at conventional elevated polyurethane curing temperatures, depending on the formulation and the type of polyurcthane.

One procedure for reacting the EPDM with the halogen donor involves what we describe as a two-step method, wherein the EPDM and halogen donor are first masticated together at elevated temperature, for example in an internal mixer such as a Banbury mixer, in the presence if desired of such compounding ingredients as carbon black, sulfur, oil, silicate filler, etc., but in the absence of accelerator or activator which would cause premature cure of the EPDM during the hot mixing at such a highly elevated temperature. Ordinarily the temperature reached in this first state of mixing will be at least about 135° C, usually about 145° to 170° C, which is maintained for ½ to 5 minutes (time and temperature usually being roughly inversely related) to bring about reaction between the halogen donor and the EPDM without curing the EPDM. Thereafter, at a lower temperature (e.g., about 95° C) the accelerators and activators are blended in to complete the sulfur-curing recipe for the vulcanizable EPDM stock. The vulcanizable EPDM stock is then shaped into a desired form by any suitable conventional method (e.g., calendering, extrusion, injection molding, compression molding); the resulting shape is then cured under conventional curing conditions (e.g., about 5 to 30 minutes at about 150° to 200° C., the time and temperature usually being roughly inversely related), and is thereafter ready for application of the curable polyurethane.

The polyurethane may be applied to the cured treated EPDM in any desired manner. Thus, a mixture of polyurethane and diamine curative may be cast on the surface of the EPPM, or the polyurethane may be painted (e.g., sprayed, brushed or dipped) onto the EPDM shape. If desired the polyurethane may be dissolved in a solvent or dispersed in a suitable volatile liquid carrier to facilitate application to the EPDM. Alternatively, a solid film or sheet of the polyurethane composition may be laminated onto the surface of the EPDM article. The assembly is thereafter subjected to conventional polyurethane curing conditions (ranging from ambient temperature to elevated temperatures, depending on the polyurethane formulation) to cure the polyurethane, and at the same time develop the adhesive bond between the two materials.

Another procedure for reacting the EPDM with the halogen donor involves what we refer to as a one-step mixing procedure, in accordance with which the entire mix including EPDM rubber, halogen donor, silicate filler, curative for the rubber, especially sulfur, accelerator of sulfur vulcanization, etc., is blended essentially in a single mixing operation at a temperature insufficient to bring about cure. After shaping the mixture it is heated to conventional EPDM curing temperatures to cure the EPDM, and in the course of this heating step the halogen donor also reacts with the EPDM. Thereafter, the polyurethane composition may be applied to the surface of the cured, halogen donor-modified EPDM, and the assembly may be cured as described above to create the adhesive bond.

The one-step method is usually preferred because it is simpler, requires less energy, and is less time consuming then the two-step method.

The invention is particularly applicable to the manufacture of painted rubber articles, notably EPDM automobile parts painted with an automotive paint based on polyurethane. Frequently commercial polyurethane-based painting systems include a urethane-based automotive primer and topcoat.

Ordinarily the halogen donating material is employed in amount sufficient to provide from about 0.5 to 5 parts, preferably about 1 to 2.5 parts, of halogen per 100 parts by weight of EPDM.

In the preferred practice of the invention a particulate silicate filler is present in the EPDM mixture, usually in amount of from about 10 to 120 parts of such filler, per 100 parts by weight of EPDM.

Preferred silicate fillers are hydrated calcium silicate (e.g., the commercial material known as "Silene D") and clay (e.g. kaolin clay, largely aluminum silicate); other suitable silicates may be used such as those of such metals as copper, magnesium, lead and zinc.

Before application of the polyurethane to the EPDM surface to which it is to be adhered, the EPDM surface should be thoroughly cleaned, for example by washing the surface with a conventional commercial cleaning agent or with a suitable solvent such as toluene, followed by drying.

The strength of the adhesive bond between the EPDM and the polyurethane is conveniently measured essentially following the 180° peel adhesion test ASTM D-816, method C, wherein laminates or composite articles of the invention exhibit bond strengths of at least 10 ppi (pounds per inch), preferably at least 18 ppi.

The following examples, in which all quantities are expressed by weight, will serve to illustrate the practice of the invention in more detail.

EXAMPLE 1

This example illustrates the two-step hot mixing technique, employing a number of stocks, identified as I-1 to I-3 in Table I. The EPDM elastomer employed is a terpolymer of ethylene, propylene (56/44 weight ratio) and 5-ethylidene-2-norbornene (5% by weight) having a specific gravity of 0.865 and a Mooney viscosity of 55 ML-4 at 100° C. The halogen doner is 1,3-dichloro-5,5-dimethylhydantoin (molecular weight 197; 33% chlorine), employed in varying quantity in the stocks as shown in Table I. In the first stage of the mixing the following ingredients are charged to a Banbury mixer: 100 parts EPDM, variable quantity halogen donor (see Table I), 2 parts sulfur, 20 parts hydrated calcium silicate, 40 parts paraffinic petroleum hydrocarbon extender oil (specific gravity 0.88), and 100 parts fast extrusion furnace carbon black (FEF). The mix is allowed to reach a temperature of 149° C. and is held at this temperature while masticating for 1 minute to react the EPDM with the halogen donor. The mix is discharged, sheeted off a two roll mill, and allowed to cool to room temperature.

In a second stage the Banbury is charged with the foregoing compound, 5 parts zinc oxide, 1.5 parts 2-mercaptobenzothiazole, 0.7 parts tetramethylthiuram disulfide, 0.7 parts tetraethylthiuram disulfide, and 2 parts triethanolamine. The batch is allowed to reach 93° C. and discharged. The uncured compound is cooled on a two roll mill and sheeted off to 0.085 inch thickness and allowed to cool at room temperature.

The resultant rubber sheets are cut into 6 × 6 inch slabs, placed in 6 × 6 × 0.08 inch molds and cured for 8 minutes at 182° C. The cooled and cured rubber slabs are then placed in a 6 × 6 × 0.16 inch mold. A one inch strip along one edge of the slab is covered with a piece of polyester film.

A polyurethane composition is prepared for adhesion to the cured EPDM, using an isocyanate-terminated polyurethane prepolymer which is a liquid reaction product of 220.5 g (0.44 equivalents) of polytetramethylene ether glycol (1000 mol. wt.), and 79.5 g (0.91 equivalents) of tolylene diisocyanate (TDI, essentially a mixture of 2,4- (80%) and 2,6- (20%) isomers), viscosity 6 poises at 70° C., free NCO content ca. 6.6% by weight. A curing agent for the polyurethane prepolymer, p,p'-methylenebis(o-chloroaniline), is heated to 100° C. and mixed into the polyurethane prepolymer (also heated to 100° C.) in ratio of 19 parts curing agent to 100 parts polyurethane prepolymer.

The liquid polyurethane mix is cast over the previously prepared EPDM cured specimen using a slight excess in order to assure complete filling of the mold. A cover is placed on the mold while the excess urethane polymer is allowed to escape. The closed mold is then placed into a heated press under about 600 psi pressure and cured for 1 hour at 100° C., followed by 24 hours at 70° C. in an air oven. After curing the laminate, the non-adhered (due to the interlaying polyester film) ends of the EPDM and the polyurethane portions are clamped with a tensile tester (Scott Tester Model XL) for the peel adhesion test. The pull rate is 2 inches per minute. The results are shown in Table I, expressed in pounds per inch. In addition to measuring the peel adhesion strength, the nature of the failure is also observed. If all of the failure occurs in the EPDM, the adhesion is rated as excellent, as indicated by "A" in Table I. If partial failure occurs with more than 50% of the EPDM adhering to the polyurethane surface the ashesion is rated as acceptable, as indicated by "B" in Table I. The adhesion is rated as poor, indicated by "C" in Table I, if no EPDM failure is observed.

Table I

Adhesion Testing of EPDM-Urethane Laminates
Two-Step (Hot Mix) Procedure

| Stock: | I-1 | I-2 | I-3 |
|---|---|---|---|
| Variable | | | |
| Halogen donor | 5 | 3.5 | 1.0 |
| Results | | | |
| Peel adhesion | 23 | 18 | 8 |
| Rating | A | B | C |

EXAMPLE 2

In this example the one-step procedure is used to make stocks II-1 to II-4 as indicated in Table II. The Banbury mixer is charged with 100 parts of the EPDM described in Example 1, variable quantities of the same halogen donor as in Example 1, 100 parts FEF black, 40 parts oil (as in Example 1), 20 parts hydrated calcium silicate filler and 2 parts sulfur. The mixing temperature is allowed to reach 93° C. and then 5 parts zinc oxide, 1.5 part 2-mercaptobenzothiazole, 0.7 part tetramethylthiuram disulfide and 2 parts triethanolamine are added, and mixing is continued until the temperature reaches 115° C. The mix is then discharged, cooled to 38° C. on a two roll mill and sheeted off to a 0.08 inch thickness. Shaping and curing was accomplished according to Example 1.

The polyurethane mixture described in Example 1 is then cast coated on the cured EPDM specimen as there described followed by cure of the polyurethane layer of the resulting laminate as described in Example 1. Adhesion testing yields the results shown in Table II.

Table II

Adhesion Testing of EPDM-Urethane Laminates
One-Step Mixing Procedure

| Stock: | II-1 | II-2 | II-3 | II-4 |
|---|---|---|---|---|
| Variable | | | | |
| Halogen donor | 7.0 | 5.0 | 3.5 | — |
| Results | | | | |
| Peel Adhesion | 22 | 23 | 27 | 8 |
| Rating | A | A | A | C |

We claim:

1. A method of adhering a polyurethane to the surface of a cured ethylene-propylene-non-conjugated diene terpolymer rubber article comprising mixing the said terpolymer rubber, prior to cure thereof, with a curative in amount sufficient to cure the terpolymer rubber and with a halogen donor selected from the group consisting of (1) N,N-dihalogenated aromatic sulfonamides wherein the sulfonamide nitrogen is bonded to two atoms of chlorine, bromine or iodine and the sulfonyl sulfur is bonded directly to the aromatic nucleus and (2) cyclic N-halogenated amides wherein a carbonyl carbon in the ring is bonded to two nitrogen atoms, each of said nitrogen atoms in turn being bonded to a halogen atom thereby forming the grouping

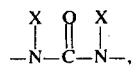

wherein X is chlorine, bromine or iodine, the amount of said halogen donor being sufficient to provide from 0.5 to 5 parts of halogen per 100 parts by weight of said terpolymer rubber, and thereafter subjecting the resulting mixture of terpolymer rubber and halogen donor to elevated temperature sufficient to cure the terpolymer rubber and at the same time bring about reaction between the terpolymer rubber and the halogen donor, subsequently applying to a surface of the thus-cured terpolymer rubber a polyurethane prepolymer which is a polyol-polyisocyanate reaction product in admixture with a bifunctional curative for the prepolymer in amount sufficient to cure the prepolymer, and thereafter subjecting the assembly to an elevated temperature sufficient to cure the prepolymer, whereby an adhesive bond is created between the cured polyurethane and the terpolymer rubber surface.

2. A method as in claim 1 in which the said terpolymer rubber contains from 10 to 120 parts of a particulate silicate filler per 100 parts by weight of said terpolymer rubber.

3. A method as in claim 2 in which the said particulate silicate filler is selected from the group consisting of hydrated calcium silicate and clay.

4. A method as in claim 3 in which the said filler is hydrated calcium silicate.

5. A method as in claim 1 wherein the said halogen donor is a hydantoin having the general formula:

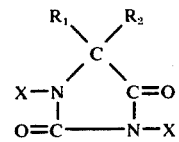

wherein X is chlorine, bromine or iodine and $R_1$ and $R_2$ are hydrogen or an alkyl group having from 1 to 4 carbon atoms.

6. A method as in claim 5 wherein the said halogen donor is 1,3-dichloro-5,5-dimethylhydantoin.

7. In a method of adhering a polyurethane to ethylene-propylene-non-conjugated diene terpolymer rubber wherein a curable polyurethane is applied to a surface of a cured shaped article made of said rubber and the polyurethane is thereafter cured, the improvement comprising mixing into the said rubber, before shaping and cure thereof, a halogen donor selected from the group consisting of (1) N,N-dihalogenated aromatic sulfonamides wherein the sulfonamide nitrogen is bonded to two atoms of chlorine, bromine or iodine and the sulfonyl sulfur is bonded directly to the aromatic nucleus and (2) cyclic N-halogenated amides wherein a carbonyl carbon in the ring is bonded to two nitrogen atoms, each of said nitrogen atoms in turn being bonded to a halogen atom thereby forming the grouping

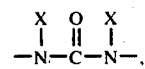

wherein X is chlorine, bromine or iodine and heating the resulting mixture of said rubber and halogen donor to a temperature sufficient to bring about reaction between the said rubber and the halogen donor, whereby adhesion of the subsequently applied polyurethane to the surface of the terpolymer rubber is substantially enhanced.

8. A method as in claim 7 in which the amount of said halogen donor is sufficient to provide from 0.5 to 5 parts of halogen per 100 parts by weight of said terpolymer rubber.

9. A method as in claim 7 in which the said terpolymer rubber contains from 10 to 120 parts of a particulate silicate filler per 100 parts by weight of said terpolymer rubber.

10. A method as in claim 7 wherein the said halogen donor is a hydantoin having the general formula:

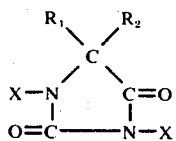

wherein X is chlorine, bromine or iodine and $R_1$ and $R_2$ are hydrogen or an alkyl group having from 1 to 4 carbon atoms.

11. A method as in claim 7 wherein the said halogen donor is 1,3-dichloro-5,5-dimethylhydantoin.

12. A method as in claim 7 in which the polyurethane contains a bifunctional curing agent for the polyurethane in amount sufficient to cure the polyurethane and the cure of the polyurethane is carried out at elevated temperature.

13. A composite article comprising cured ethylene-propylene-non-conjugated diene terpolymer rubber having adhered to a surface of the terpolymer rubber a cured polyurethane, produced by the method of claim 7.

* * * * *